United States Patent
Donaldson

(10) Patent No.: US 9,503,499 B1
(45) Date of Patent: Nov. 22, 2016

(54) CONCEALING LATENCY IN DISPLAY OF PAGES

(71) Applicant: Amazon Technologies, Inc., Reno, NV (US)

(72) Inventor: Jesse Earl Donaldson, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 470 days.

(21) Appl. No.: 13/788,510

(22) Filed: Mar. 7, 2013

(51) Int. Cl.
*G06F 15/16* (2006.01)
*H04L 29/08* (2006.01)
*G06F 17/30* (2006.01)

(52) U.S. Cl.
CPC ......... *H04L 67/02* (2013.01); *G06F 17/30899* (2013.01); *H04L 67/2847* (2013.01); *H04L 67/2852* (2013.01)

(58) Field of Classification Search
CPC .............................................. G06F 17/30899
See application file for complete search history.

(56) References Cited

U.S. PATENT DOCUMENTS

| | | | | |
|---|---|---|---|---|
| 5,794,259 A * | 8/1998 | Kikinis | G06F 17/243 | 709/218 |
| 5,802,292 A * | 9/1998 | Mogul | G06F 17/30902 | 707/E17.12 |
| 6,366,947 B1 * | 4/2002 | Kavner | | 709/203 |
| 6,510,458 B1 * | 1/2003 | Berstis et al. | | 709/219 |
| 6,993,591 B1 * | 1/2006 | Klemm | H04L 67/2847 | 707/999.002 |
| 8,239,491 B1 * | 8/2012 | Tsun | G06F 17/30902 | 705/14.67 |
| 8,650,214 B1 * | 2/2014 | Wilhelm | H04L 63/1483 | 707/769 |
| 8,775,440 B2 * | 7/2014 | Saxena | G06F 17/30902 | 707/748 |
| 2005/0192814 A1 * | 9/2005 | Challener | G06Q 30/02 | 705/1.1 |
| 2006/0010225 A1 * | 1/2006 | Issa | | 709/217 |
| 2006/0101514 A1 * | 5/2006 | Milener | G06F 17/30902 | 726/22 |
| 2006/0129766 A1 * | 6/2006 | Cassia | G06F 17/30902 | 711/137 |
| 2007/0136533 A1 * | 6/2007 | Church | G06Q 30/0277 | 711/137 |
| 2007/0143672 A1 * | 6/2007 | Lipton | G06F 17/30899 | 715/205 |
| 2007/0288589 A1 * | 12/2007 | Chen et al. | | 709/217 |
| 2008/0034031 A1 * | 2/2008 | Weisbrot | G06F 17/30902 | 709/203 |
| 2010/0250706 A1 * | 9/2010 | Burckart et al. | | 709/219 |
| 2010/0332586 A1 * | 12/2010 | Jogand-Coulomb | H04L 67/2847 | 709/203 |
| 2012/0221932 A1 * | 8/2012 | Gleadall | G06F 17/30902 | 715/208 |
| 2013/0007016 A1 * | 1/2013 | Saxena | G06F 17/30902 | 707/748 |
| 2014/0108512 A1 * | 4/2014 | Guan | G06F 17/30902 | 709/203 |
| 2014/0379841 A1 * | 12/2014 | Zong et al. | | 709/213 |
| 2015/0039622 A1 * | 2/2015 | Sampath-Kumar | G06F 17/3089 | 707/740 |

* cited by examiner

*Primary Examiner* — Aftab N. Khan
(74) *Attorney, Agent, or Firm* — Lowenstein Sandler LLP

(57) ABSTRACT

Content logic in a web browser receives a request to load a web page in the web browser and determines whether a cached copy of the web page is available in a browser cache. If the cached copy is available, the content logic loads the cached copy of the web page in the web browser. While the cached copy of the web page is loaded, the content logic sends a request to a web server hosting the web page for updated content associated with the web page. If updated content is received from the web server, the content logic removes stale content from the cached copy of the web page and loads the updated content in the web browser.

16 Claims, 10 Drawing Sheets

CONCEALING LATENCY IN DISPLAY OF PAGES

BACKGROUND

A web browser is a software application used for retrieving, presenting and traversing information resources on the World Wide Web. An information resource is identified by a Uniform Resource Identifier (URI) and may be a web page, image, video or other piece of content. A web browser can also be defined as an application software program designed to enable users to access, retrieve and view documents and other resources on the Internet. Although browsers are primarily intended for use with the World Wide Web, they can also be used to access information provided by servers in private networks or files in file systems. Generally, a user enters the URI into an appropriate field in the web browser, and the browser retrieves and displays the corresponding resource (e.g., the web page). In many cases, the resource may be hosted on a remote web server which is accessible over a network (such as the Internet).

Given that the resource is located remotely, there is an inherent time delay in retrieving the resource over the network and displaying it in the browser. In some cases, this delay may be referred to as "network latency." The network latency may adversely affect a user's experience, as the user is forced to wait some period of time before the requested resource is available to be viewed. In order to reduce the perceived network latency, certain web browsers include a web cache (also referred to as a "browser cache"). The web cache is a mechanism for the temporary storage (i.e., caching) of resources, such as web pages, to reduce bandwidth usage and the perceived network latency. The web cache stores copies of resources requested by the browser, so that subsequent requests for the same resource may be satisfied from the cache, rather than from the remote web server. Typically, retrieving a resource from the local cache will be faster than retrieving the resource from the remote web server.

In many cases, web pages and other resources are updated over time with new content. Thus, depending on when the web page was cached, it is possible that the cached copy of a web page no longer matches the current web page provided by the web server. It is important to the user experience that the browser displays the most recent content in response to a user request for a resource. Therefore, when retrieving a resource from the local cache, most web browsers will verify that the there have been no updates to the cached content (i.e., that the cached content is not out-of-date) before displaying the cached copy of the web page. This verification may also take some amount of time (though probably less time than retrieving the entire resource from the web server), so the requested web page may still not be available instantly. Some conventional browsers display a static image of the cached content (which may be faded out to indicate that it is just an image, for example) during the time that the verification is taking place. In this case, however, the browser does not display a functional page that the user can interact with, and the user is forced to wait until the verification, and potentially the download of the new version of the page if the cached copy is stale, is complete. This delay can adversely affect the user experience.

BRIEF DESCRIPTION OF THE DRAWINGS

Embodiments of the present invention will be understood more fully from the detailed description given below and from the accompanying drawings, which, however, should not be taken to limit the present invention to the specific embodiments, but are for explanation and understanding only.

DETAILED DESCRIPTION

Figure 1:
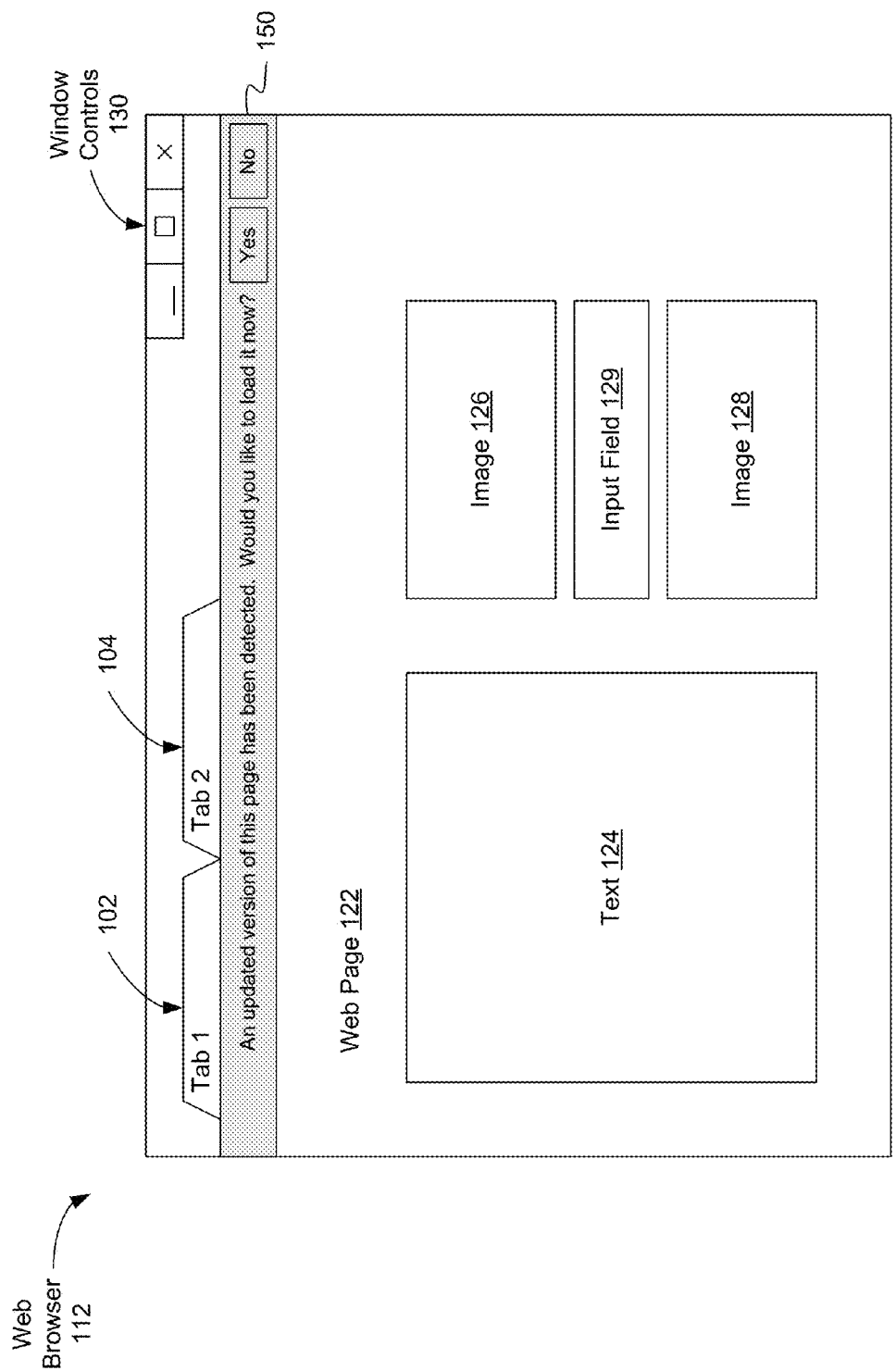
FIG. 1 is a diagram illustrating a web browser configured to conceal network latency in the display of a web page, according to an embodiment.

Embodiments of a method and apparatus are described for concealing network latency in the display of web pages. In one embodiment, a web browser can eliminate or reduce the perceived network latency in the retrieval and display of web pages through the use of a browser cache. The browser cache may locally store a copy of resources (e.g., web pages and web page objects) that were previously requested by the browser. Subsequent requests for the same resource(s) may be satisfied from the browser cache, rather than from the remote web server. In one embodiment, the browser verifies that the there have been no updates to the cached content since it was cached. For example, content logic in the web browser may send a request to the remote web server that hosts the web page to determine if there have been any updates to the web page content since the cached copy was saved. While the content logic is generating and sending that request and waiting for a response, the content logic may direct the browser to display the cached copy of the web page. This cached copy may be out-of-date, however, it remains a fully functional resource that the user may interact with while the content logic is determining whether there is updated content available. In addition, the cached copy is displayed in response to a request for the web page much faster than a new copy from the web server could be displayed.

If the content logic receives updated content from the web server, the content logic may transition from the stale cached content that is currently displayed in the browser, to the fresh updated content. In one embodiment, for example, where the update is minor or insignificant, content logic may instruct the browser to subtly transition to the new content. For example, if only one image on a web page has been updated, but the rest of the page remains the same, the browser may simply replace the image with the updated image without prompting the user. In some cases, the browser may use some visual effects, such as a fade in/fade out, to make the transition less jarring. In another embodiment, where the update is larger or more significant, possibly affecting a major object or multiple objects on the page, content logic may initiate a manual web page content update. In this case, transition logic within a user interface portion of the browser may display a dialog box, pop-up window, notification bar, or other indication that there is updated content available for the current web page being viewed. The indication may allow the user to select whether to transition to the updated content or to continue viewing and interacting with the currently displayed cached copy. If the user selects to transition, the web browser may load the updated content in the new version of the web page. This may include, for example, refreshing or reloading the entire web page.

In one embodiment, the content logic may make a determination of whether the network latency concealing method is appropriate for a particular web page. The content logic may do so, for example, by consulting an exclusion list which includes a list of websites which should be excluded from the network latency concealing process including displaying a cached copy of the web page and transitioning to updated content if found. In one embodiment, web pages may be manually added to the exclusion list. In other embodiments, the content logic may analyze each web page that is requested and make a determination of whether to add the web page to the exclusion list. For example, the content logic may monitor its own behavior with respect to certain web pages and analyze that behavior to make the determination. There are a number of factors that may be considered when deciding whether to add a particular web page to the exclusion list, such as for example, the typical length of time it takes a particular web page to load, the percentage of time that cached content for a particular web page is deemed stale, the type of content updates that are most often made to a web page, or other factors.

Using the techniques and methodologies described herein, the content logic and the transition logic in the web browser can improve the user experience with respect to the display of web pages. Displaying a fully functional cached copy of a web page while the web browser is verifying whether there is any updated content available, allows the user to begin viewing and interacting with the page much sooner than if they were forced to wait for the verification to complete. This can lessen either the perceived network latency, the actual network latency, or both, associated with the display of the webpage.

FIG. 1 illustrates a web browser configured to conceal network latency in the display of a web page, according to an embodiment. In this embodiment, web browser 112 includes one or more browsing tabs 102, 104 and window controls 130. Browsing tabs 102 and 104 allow multiple web pages to be viewed in a single browser window. For example, a user may request to load or display web page 122 in browsing tab 102. In one embodiment, web browser 112 may determine if a copy of web page 122 is stored in a local cache on the device which is running web browser 112. Typically, retrieving the cached copy of web page 122 from the local cache will be faster than retrieving a new copy of the web page from a remote web server that hosts the web page. If a cached copy is found, web browser 112 may display the cached copy of web page 122 in response to the user's request. This may significantly lessen the perceived network latency in loading the requested web page 122.

In one embodiment, web page 122 may include a number of content objects, such as text block 124, images 126 and 128 and input field 129. These content objects may be displayed in web browser 112 as part of the cached copy of web page 122. In the cached copy of web page 122, all of the content objects remain "live" and are able to be interacted with by the user of web browser 112. For example, the user may click on any hyperlinks in text block 124 to be directed to a new page, or the user may input user information into input field 129. While the cached copy is displayed, web browser 112 may determine whether there is any updated content associated with web page 122 available from the web server. Over time, web servers may update hosted web pages to provide new or different content. For example, a news web site may periodically publish breaking news stories as updated content. These changes or updates may have occurred in the period of time since the cached copy of web page 122 was saved by web browser 112. Thus, since the content in the cached copy of web page 122 is out-of-date, it may be referred to as "stale" content. In one embodiment, web browser 112 may send a request to the web server for the updated content. The updated content may include, for example, a change to one of the content objects 124, 126, 128, 129, the addition of a new content object or the removal of a previously displayed content object.

In one embodiment, if web browser 112 receives updated content associated with web page 122 or is otherwise notified that the updated content is available, web browser 112 may display a notification that the updated content is available for the currently displayed web page 122. In one embodiment, the notification may be provided in the form of a notification bar 150, displayed, for example, at the top of the browser window. In other embodiments, the notification bar 150 may be displayed in some other location, such as the bottom or side of the browser window or in some other location. In other embodiments, the notification may take a different form, such as a graphical dialog box or pop-up window, an audio notification, a tactile notification or some other form. The notification may include an indication that updated content is available, as well as provide the ability to receive user input indicating whether or not to transition to the updated content. For example, the notification bar 150 may include user selectable buttons, through which the user can input his desire to load the updated content or to continue viewing and interacting with the cached copy of web page 122.

Figure 2:
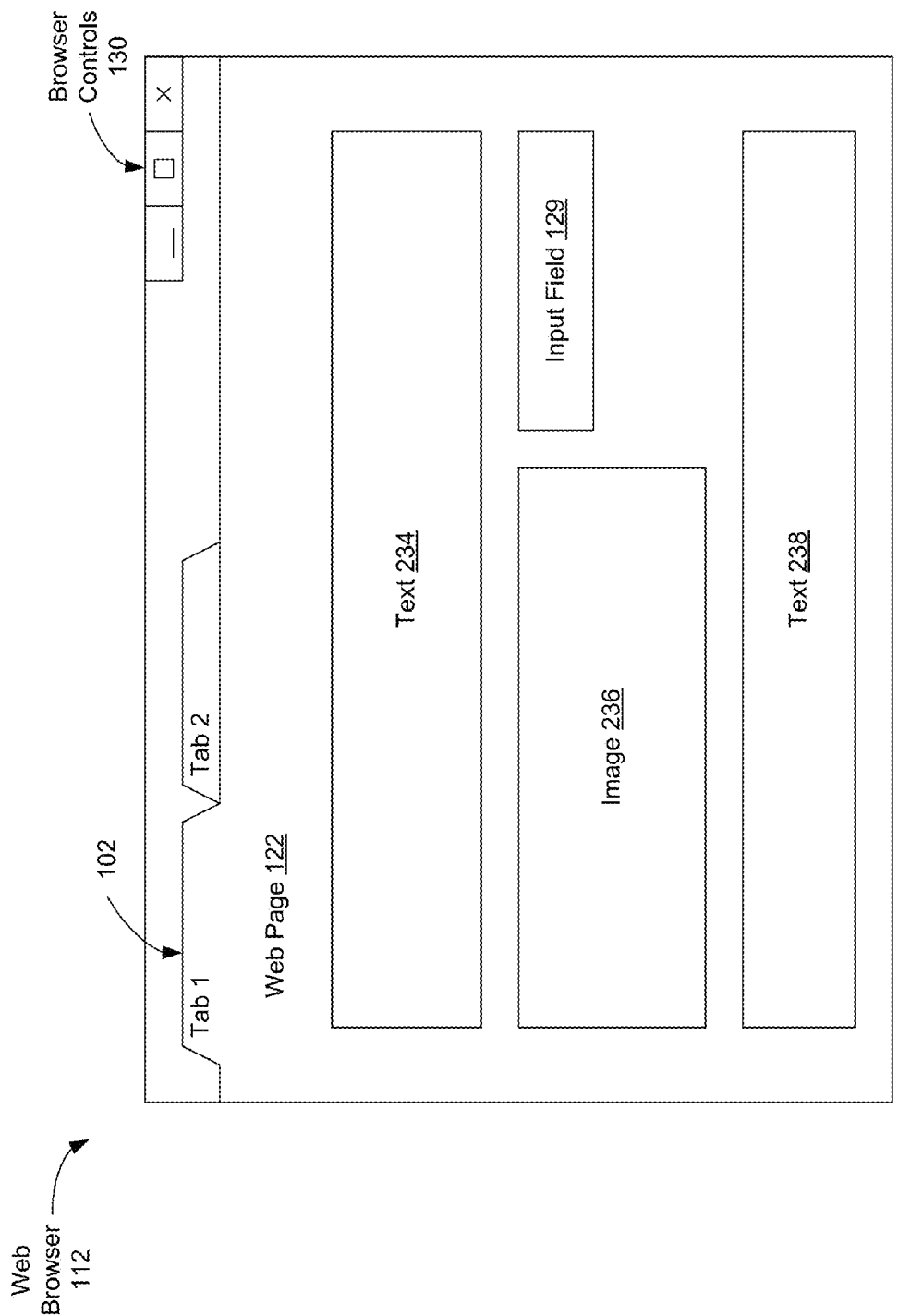
FIG. 2 is a diagram illustrating a web browser configured to conceal network latency in the display of a web page, according to an embodiment.

If the user selects to load the updated content associated with web page 122, web browser 112 may transition from the cached copy of the web page to the new content. As shown in FIG. 2, the new content for web page 122 may include a different set of content objects. In the illustrated embodiment, the updated content objects include text blocks 234 and 238 and image 236. The updated web page 122 also maintains the previously displayed input field 129. In other embodiments, the updated content may include entirely new content objects, changes to previously displayed content objects, and/or some combination of old and updated content objects. Additional details of the network latency concealing methods described herein will be provided below with respect to FIGS. 2-10.

Figure 3:
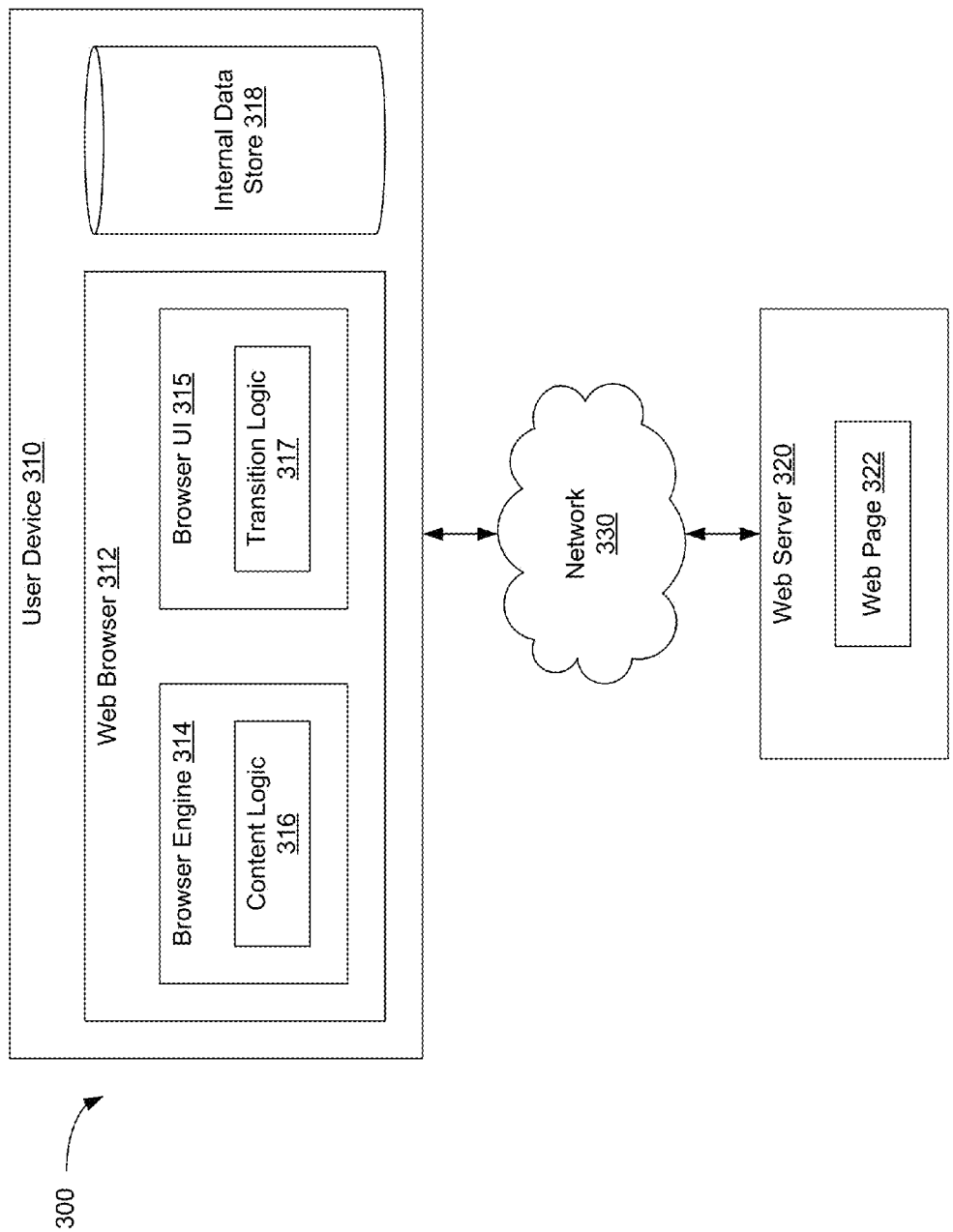
FIG. 3 is a block diagram illustrating an exemplary network architecture in which implementations of the present invention may be implemented.

FIG. 3 is a block diagram illustrating an exemplary network architecture in which embodiments of the present invention may be implemented. The network architecture 300 may include one or more user devices 310 communicating with one or more servers, such as web server 320 over one or more networks 330, according to one embodiment. Network 330 can be a local area network (LAN), a wireless network, a telephone network, a mobile communications network, a wide area network (WAN), such as the Internet, or similar communication system. User device 310 may be any type of computing device including a server computer, gateway computer, desktop computer, laptop computer, mobile communications device, cell phone, smart phone, hand-held computer, tablet computer, or similar computing device. User device 310 may be variously configured with different features to enable viewing of content and resources, such as web page 322.

Web server 320 may include a network-accessible server-based functionality, various data stores, and/or other data processing equipment. Web server 320 may be implemented by a single machine or a cluster of machines. Web server 320 may be hosted, for example, by computer system 1000 of FIG. 10. In one embodiment, web server 320 hosts web page 322. Web server 320 can deliver web page 322 to user device 310 or another client device using for example the Hypertext Transfer Protocol (HTTP). Web page 322, for example, be representative of web page 122 discussed above with respect to FIG. 1.

For example, when a user of user device 310 views web page 322, using a web browser 312 or other program running on user device 310, web browser 312 can send a message to web server 320 requesting web page 322. Web server 320 can return data corresponding to web page 322 to the user device and a version of web page 322 may be displayed in web browser 312. In one embodiment, web browser 312 can store or cache a copy of web page 322 in an internal local data store 318 in user device 310. For subsequent requests to load web page 322, web browser may retrieve the page content from internal data store 318, rather than from web server 320, to improve page load time. In another embodiment, rather than caching page content in internal data store 318, content logic 316 may utilize some other network attached storage (e.g., in a computing cloud). This network storage may still provide faster access than retrieving the content from web server 320 over network 330.

In one embodiment, web browser 312 may include browser engine 314 and browser user interface (UI) component 315. Browser engine 314 may be responsible for taking marked up content (such as HTML, XML, etc.) and formatting information and displaying the formatted content on the screen. For example, the browser engine 314 may receive URL input by the user and a screen rectangle as arguments, and then retrieve the content corresponding to the URL (either from web server 320 or from internal data store 318) and paints a graphical representation of it on the given rectangle. Browser engine may also handle links, cookies, scripting, plug-ins loading and other matters. User interface component 315 may provides the menu bar, address bar, status bar, bookmark manager, history and preferences window among other things in web browser 312. It may serve as an interface between the user and the browser engine 314.

In one embodiment, browser engine 314 may include content logic 316. Content logic 316 may verify that the there have been no updates to the cached content in internal data store 318, since it was cached. For example, content logic 316 may send a request to web server 320 to determine if there have been any updates to web page 322 since the cached copy was saved. While content logic 316 is generating and sending that request and waiting for a response, content logic 316 may direct browser engine 314 to display the cached copy of web page 322. This cached copy may be out-of-date, however, it remains a fully functional resource that the user may interact with while content logic 316 is determining whether there is updated content available.

If content logic 316 receives updated content from web server 320, content logic 316 may transition from the stale cached content that is currently displayed in the web browser 312, to the fresh updated content. In one embodiment, for example, where the update is minor or insignificant, content logic 316 may instruct browser engine 314 to subtly transition to the new content. For example, if only one image on a web page has been updated, but the rest of the page remains the same, browser engine 314 may simply replace the image with the updated image without prompting the user. In some cases, browser engine 314 may use some visual effects, such as a fade in/fade out, to make the transition less jarring. In another embodiment, where the update is larger or more significant, possibly affecting a major object or multiple objects on the page, content logic 316 may initiate a manual web page content update. In this case, transition logic 317 within a user interface component 315 may display a dialog box, pop-up window, notification bar, or other indication that there is updated content available for the current web page being viewed. The indication may allow the user to select whether to transition to the updated content or to continue viewing and interacting with the currently displayed cached copy. If the user selects to transition, the web browser 312 may load the updated content in the new version of the web page 322. This may include, for example, refreshing or reloading the entire web page 322. Additional details of content logic 316 and transition logic 317 are provided below.

Figure 4:
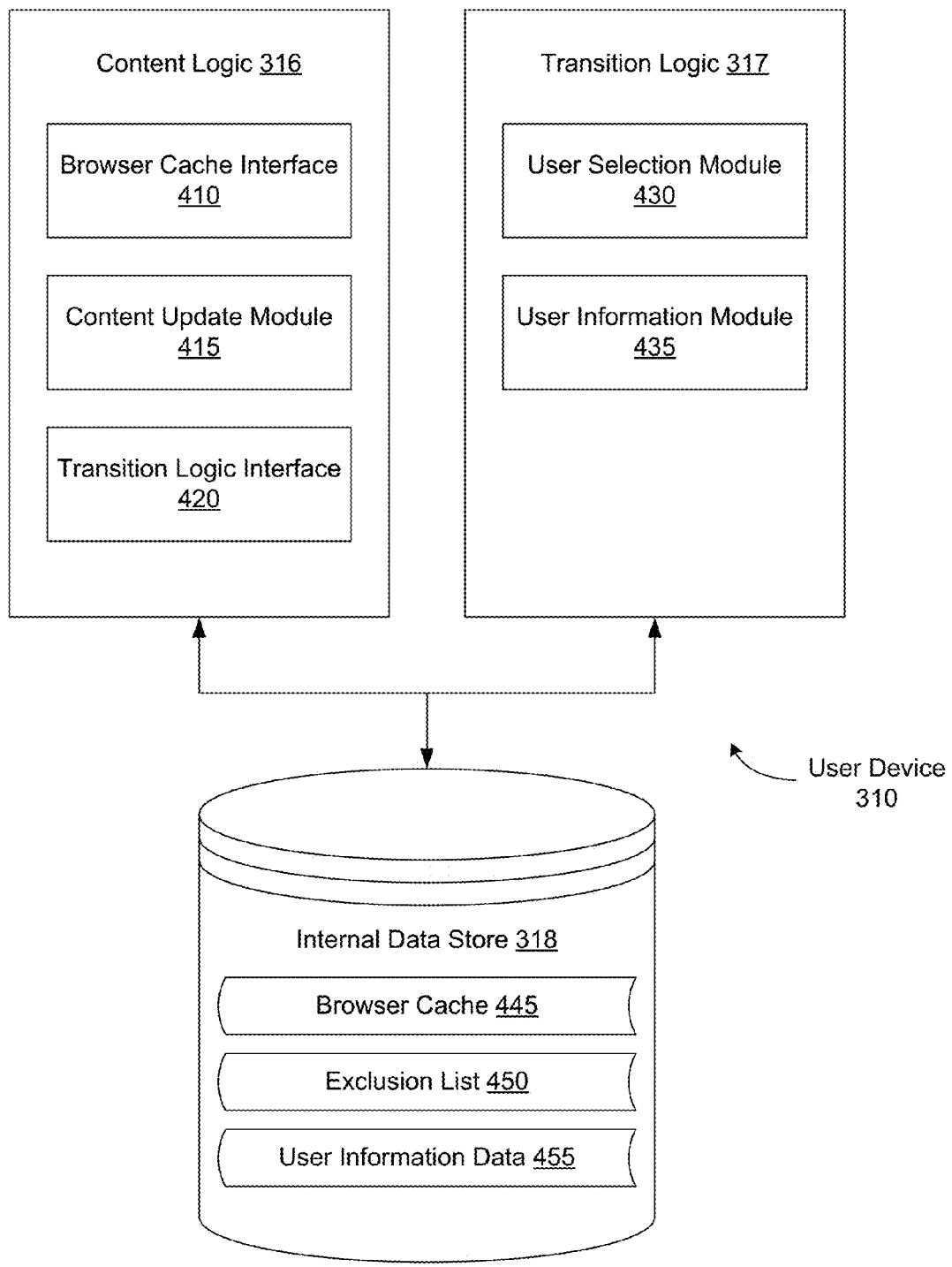
FIG. 4 is a block diagram illustrating content logic and transition logic for concealing network latency in the display of a web page, according to an embodiment.

FIG. 4 is a block diagram illustrating content logic 316 and transition logic 317 that are included in the browser running on user device 310, according to an embodiment. In one embodiment, content logic 316 may include browser cache interface 410, content update module 415 and transition logic interface 420. Transition logic 317 may include user selection module 430 and user information module 435. The illustrated embodiment shows one possible arrangement of the modules and components. It should be understood that in other embodiments, there may be additional and/or different modules and components and that multiple modules and components may be combined together or separated into multiple components. In addition, certain modules of content logic and transition logic may alternatively be located in different locations (e.g., within the browser engine 314 rather than the browser UI 315 or vice versa). In one embodiment, content logic 316 and transition logic 317 are connected to internal data store 318, which may be, for example, a file system, database, cache or other data management layer resident on a data storage device such as a disk drive, RAM, ROM, flash memory, etc.

In one embodiment, browser cache interface 410 handles communications between the web browser 312 and a browser cache 445 located in internal data store 318. In one embodiment, browser cache 445 provides temporary storage (i.e., caching) of resources, such as web pages, to reduce bandwidth usage and the perceived network latency. Browser cache 445 stores copies of resources (i.e., web pages) requested by the web browser 312, so that subsequent requests for the same web page may be satisfied from the browser cache 445, rather than from remote web server 320. Typically, retrieving a web page from browser cache 445 will be faster than retrieving the resource from the remote web server 320. In one embodiment, when web browser 312 receives a request to load a web page, browser cache interface 410 will determine whether a copy of the web page exists in browser cache 445. Browser cache interface 410 may compare an identifier of the web page, such as a URI or URL, to a list of the resources stored in browser cache 445. If a copy of the web page is found in browser cache 445, browser cache interface 410 may retrieve the cached copy and instruct browser engine 314 to load the cached copy.

In one embodiment, content update module 415 is responsible for determining whether any updated content associated with a currently loaded web page is available. Once browser cache interface 410 retrieves the cached copy of the requested web page and the cached copy is displayed in web browser 312, content update module 415 may send a request to web server 320 for any updated content associated with the web page. The request may include, for example, an object identifier associated with each content object that is part of the web page and a timestamp value indicating when each content object was cached. Thus, for web page 122 shown in FIG. 1, the request may include an object identifier for each of text block 124, images 126 and 128 and input field 129, as well as the corresponding timestamp values. Web server 320 may compare the timestamp value to a time when each content object was last modified to determine if the cached content objects are stale (i.e., if the timestamp value is before the time when the object was last modified, the cached content object would be considered stale or out-of-date). In other embodiments, other mechanisms may be used to determine if the content objects are stale. For example, a hash function may be applied to the data to generate a unique hash value. If any updates are made to the content objects, a corresponding hash value (calculated using the same hash function) would not match the hash value of the cached content. Therefore, it may be determined that the content has changed. If one or more of the content objects from the web page are stale, content update module 415 may receive a copy of the updated content object from web server 320. If all of the content objects are up-to-date, content update module 415 may receive an indication of such.

Transition logic interface 420 is responsible for interacting with transition logic 317 to facilitate the transition from the cached copy of a web page to any updated content received by content update module 415. In one embodiment, for example, where the update is minor or insignificant, transition logic interface 420 may instruct browser engine 314 to subtly transition to the new content. For example, if only one image on a web page has been updated, but the rest of the page remains the same, browser engine 314 may simply replace the image with the updated image without prompting the user. In another embodiment, where the update is larger or more significant, possibly affecting a major object or multiple objects on the page, transition logic interface 420 may send an indication to transition logic 317 instructing it to begin a manual web page content update.

In the case of a manual web page content update, user selection module 430 may display a dialog box, pop-up window, notification bar, or other notification that there is updated content available for the current web page being viewed. The notification may allow the user to select whether to transition to the updated content or to continue viewing and interacting with the currently displayed cached copy. If the user selects to transition, user selection module 430 may send a message to content logic 316 causing it to load the updated content in the new version of the web page. If the user selects to continue viewing the cached copy, user selection module 430 may send a message to content logic 316 indicating the same.

Figure 5:
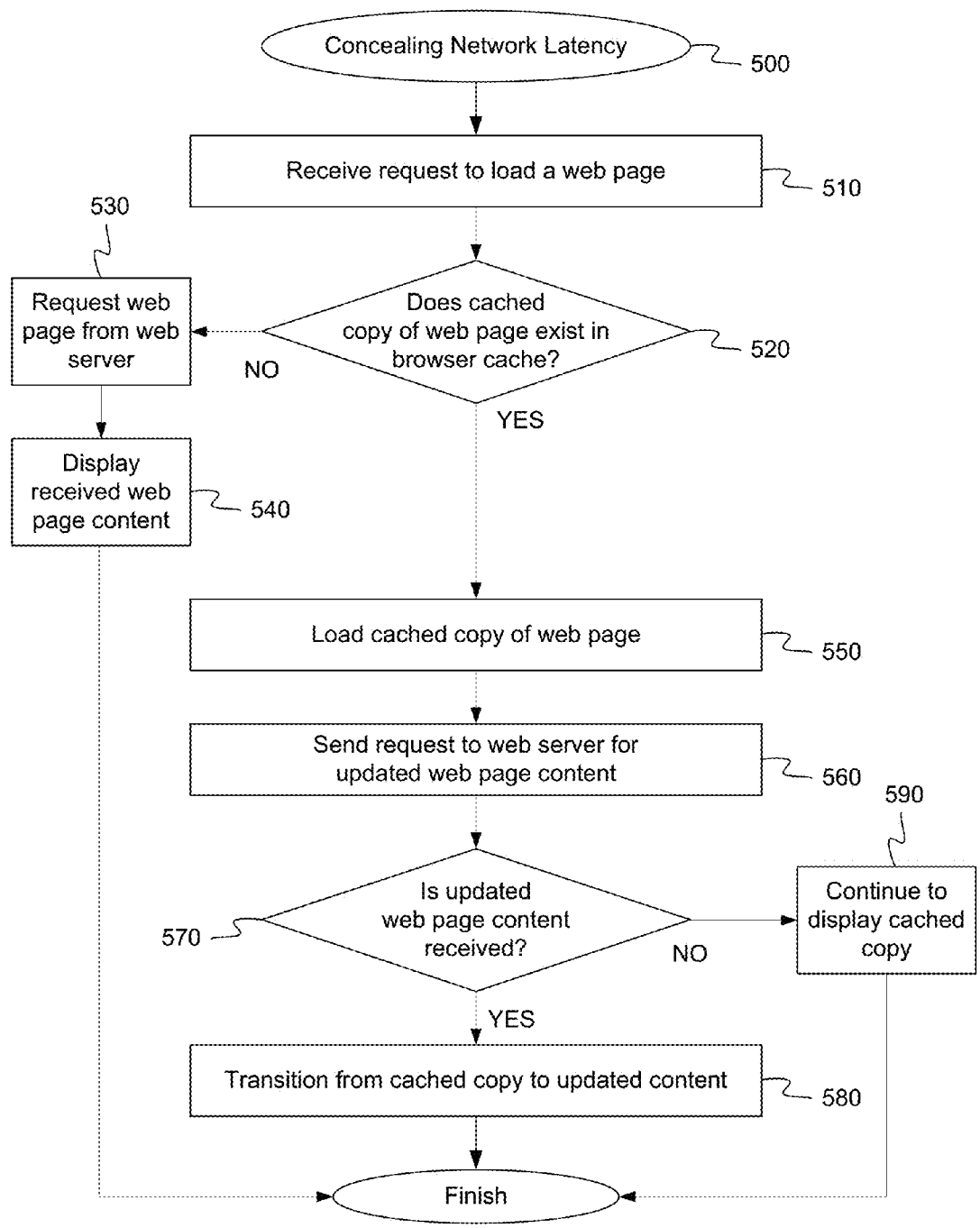
FIG. 5 is a flow diagram illustrating a method for concealing network latency, according to an embodiment.

FIG. 5 is a flow diagram illustrating method for concealing network latency, according to an embodiment of the present invention. The method 500 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured display a cached copy of a web page while making a determination of whether the content object is stale. In one embodiment, method 500 may be performed by content logic 316 and transition logic 317, as shown in FIGS. 3 and 4.

Referring to FIG. 5, at block 510, method 500 receives a request to load a web page in web browser 312. In one embodiment, a user of user device 310 may input a URL identifying the web page into an address bar of the web browser 312. Web browser 312 may then attempt to retrieve the web page and display the corresponding content to the user.

At block 520, method 500 determines whether a cached copy of the requested web page exists in a local browser cache. In one embodiment, when web browser 312 receives a request to load a web page, browser cache interface 410 will determine whether a copy of the web page exists in browser cache 445. Browser cache interface 410 may compare an identifier of the web page, such as the URI or URL, to a list of the resources stored in browser cache 445. In one embodiment, browser cache interface 410 also compares the age of the cached copy to an age threshold value. The age may determined by a timestamp value indicating when the cached copy was stored in browser cache 445. In one embodiment, the cached copy of the web page may only be displayed if the age of the cached copy is less than the age threshold value. The age threshold value may be set to a default value or may be configured by a user of user device 310, a system administrator, or some other entity.

If at block 520, method 500 determines that there is no cached copy of the web page in browser cache 445, at block 530, method 500 requests the web page from web server 320. In one embodiment, web browser 312 may issue an HTTP request for the resource corresponding to the URI of the requested web page. Web server 320 may provide those resources to web browser 312, and at block 540, web browser 312 may display the web page content received from web server 320. In some cases, depending on the speed of network 330, there may be some period of latency between when the user makes the request to load the web page and when the web page content is displayed at block 540.

If at block 520, method 500 determines that a copy of the requested web page does exist in browser cache 445, at block 550, method 500 loads the cached copy of the web page in web browser 312. In one embodiment, browser cache interface 410 retrieves the cached copy and instructs browser engine 314 to load and display the cached copy. Typically, retrieving the web page from the local browser cache 445 will be faster than retrieving a new copy of the web page from the remote web server 320. In one embodiment, when the cached copy of the web page is loaded and displayed, transition logic 317 may also display a progress indicator to indicate that the displayed web page is a cached copy and that web browser 312 is currently checking for updated content associated with the web page. The progress indicator may have a variety of forms, such as for example, an icon, a notification bar, a pop-up window, or some other form.

At block 560, method 500 sends a request to web server 320 for updated content associated with the displayed web page. Once browser cache interface 410 retrieves the cached copy of the requested web page and the cached copy is displayed in web browser 312 at block 550, content update module 415 may send a request to web server 320 for any updated content associated with the web page. The request may include, for example, an object identifier associated with each content object that is part of the web page and a timestamp value indicating when each content object was cached. Web server 320 may compare the timestamp value to a time when each content object was last modified to determine if the cached content objects are stale.

At block 570, method 500 determines whether updated web page content has been received from web server 320. If one or more of the content objects from the web page are stale, content update module 415 may receive a copy of the updated content object from web server 320. If all of the content objects are up-to-date, content update module 415 may receive an indication of such. In one embodiment, content update module 415 may examine the response received from web server 320 to determine whether it includes updated content or an indication that all of the content is up-to-date.

If at block 570, method 500 determines that updated content associated with the web page has been received, at block 580, method 500 transitions from the cached copy of the web page to the updated content. In one embodiment, this transitioning includes removing stale content objects from the displayed cached copy and displaying the updated content in the web browser 312. If at block 570, method 500 determines that no updated content has been received, at block 590, method 500 continues to display the cached copy of the web page in browser 312.

Figure 6:
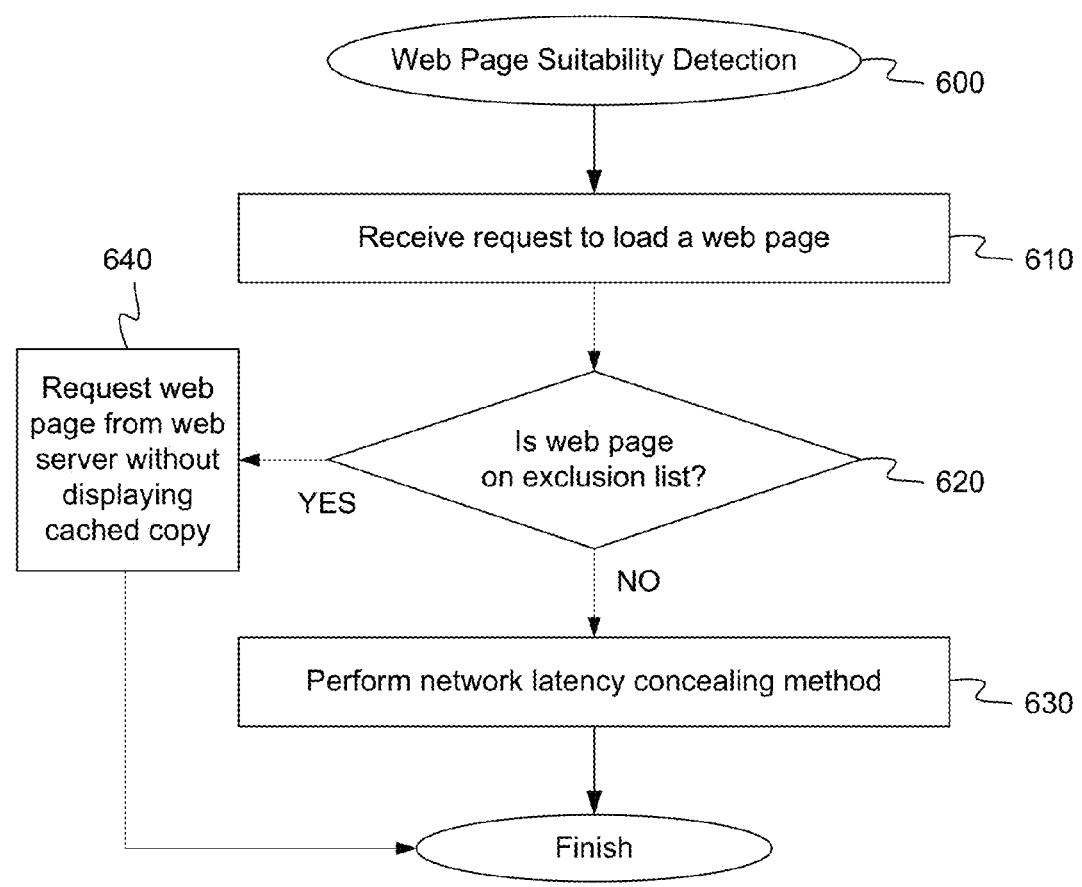
FIG. 6 is a flow diagram illustrating a web page suitability detection method, according to an embodiment.

FIG. 6 is a flow diagram illustrating a web page suitability detection method, according to an embodiment of the present invention. The method 600 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to determine whether a particular web page is suitable for use with the network latency concealing methods described herein. In one embodiment, method 600 may be performed by content logic 316 and transition logic 317, as shown in FIGS. 3 and 4.

Referring to FIG. 6, at block 610, method 600 receives a request to load a web page in web browser 312. In one embodiment, a user of user device 310 may input a URL identifying the web page into an address bar of the web browser 312. Web browser 312 may then attempt to retrieve the web page and display the corresponding content to the user.

At block 620, method 600 determines if the requested web page is found on an exclusion list 450. In one embodiment, exclusion list 450 is stored in internal data store 318 and includes a list of websites which should be excluded from the network latency concealing process including displaying a cached copy of the web page and transitioning to updated content if found. In one embodiment, browser cache interface module 410 compares the URL of the web page with a list of identifiers of web pages found on the exclusion list 450.

In one embodiment, web pages may be manually added to the exclusion list 450. In other embodiments, content logic 316 may analyze each web page that is requested and make a determination of whether to add the web page to the exclusion list 450. For example, content logic 316 may monitor its own behavior with respect to certain web pages and analyze that behavior to make the determination. There are a number of factors that may be considered when deciding whether to add a particular web page to the exclusion list 450. Any combination of one or more of these or other factors may be considered. In one embodiment, the typical length of time it takes a particular web page to load may be considered. If the web page already loads extremely fast, with minimal network latency, it may not make practical sense to perform the network latency concealing techniques, and thus, the web page may be added to exclusion list 450. In another embodiment, the percentage of time that cached content for a particular web page is deemed stale may be considered. This may generally be a factor of how often the user of web browser 312 attempts to load the page and how often the content on the web page is updated. If content logic 316 determines that the cached copy a web page is almost always deemed stale as a result of the check for updated content (i.e., blocks 560-570), the web page may be added to exclusion list 450. In another embodiment, the type of content updates that are most often made to a web page may be considered. For example, if the main content (e.g., articles, photographs) of a web page changes constantly, while only secondary content (e.g., advertisements) stays the same, the web page may be added to exclusion list 450. Other factors to consider may include, for example, whether the user has manually added the web page or other similar pages to the exclusion list 450, the overall complexity of the web page, the current network connection speed that the web browser 312 can access, or whether the web page makes use of XMLHttpRequests (XHRs). XHRs are used to send HTTP requests directly to the web server and load the server response data directly back into the browser script. In one embodiment, if the web page is using XHRs, the web page may be added to the exclusion list 450, since caching the XHRs may be difficult.

In one embodiment, instead of or in addition to exclusion list 450, internal data store 318 may include an inclusion list (not shown). The inclusion list may include a list of websites for which the network latency concealing process including displaying a cached copy of the web page and transitioning to updated content if found should be used. In one embodiment, browser cache interface module 410 may compare the URL of the web page with a list of identifiers of web pages found on the inclusion list. Similar factors to those described above may be used to determine whether a particular resource should be included on the inclusion list. In addition, content logic 316 may monitor the updates to content objects in a web page over time. If content logic 316 determines that the updates are generally minor, content logic 316 may add the current web page to the exclusion list, such that in future instances, a cached copy of the web page may be displayed while content logic 316 checks for available updates to the web page.

If at block 620, method 600 determines that the requested web page is not on exclusion list 450, at block 630, method 600 performs the network latency concealing method 500, as discussed above with respect to FIG. 5. If at block 620, method 600 determines that the requested web page is on exclusion list 450, at block 640, method 600 requests the web page from web server 320 without displaying a local cached copy of the web page. In one embodiment, web browser 312 may issue an HTTP request for the resource corresponding to the URL of the requested website. Web server 320 may provide those resources to web browser 312 and web browser 312 may display the web page content received from web server 320.

Figure 7:
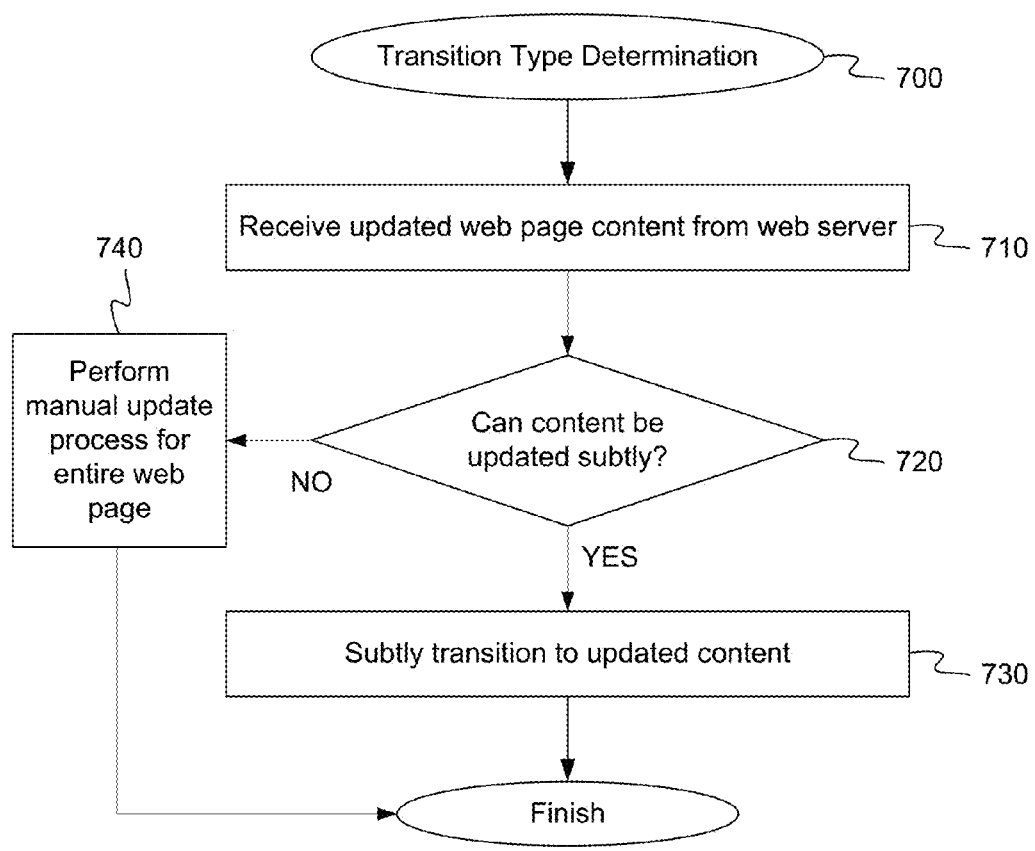
FIG. 7 is a flow diagram illustrating a transition type determination method, according to embodiment.

FIG. 7 is a flow diagram illustrating a transition type determination method, according to embodiment of the present invention. The method 700 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to determine what type of transition from cached content to updated content is appropriate for a particular web page. In one embodiment, method 700 may be performed by content logic 316 and transition logic 317, as shown in FIGS. 3 and 4.

Referring to FIG. 7, at block 710, method 700 receives updated web page content from web server 320. If one or more of the content objects in a cached copy of a web page are stale, content update module 415 may receive a copy of the updated content object(s) from web server 320, in response to a request.

At block 720, method 700 determines whether the displayed content in the web page can be updated subtly. A subtle update may include one that minimizes the negative effects on the user experience, such as by avoiding a complete refreshing or reloading of the entire web page. In one embodiment, for example, where the update is minor or insignificant, content logic 316 may instruct the browser 320 to subtly transition to the new content. For example, if only one image on a web page has been updated, but the rest of the page remains the same, the browser may simply replace the image with the updated image without prompting the user. In some cases, the browser may use some visual effects, such as a fade in/out, to make the transition less jarring.

There are a number of factors that may be considered when deciding whether to subtly transition to updated content. Any combination of one or more of these or other factors may be considered. In one embodiment, the number of content objects on a web page that were updated may be considered. For example, if the total number of objects that were updated is below or equal to a threshold value, method 700 may determine that the content can be updated subtly. In another embodiment, method 700 may consider what percentage of the content objects on the page was updated. In another embodiment, the type of objects that were updated may be considered. For example, if the main content (e.g., articles, photographs, headline) of a web page has been updated, a subtle transition may not be appropriate. If, however, only secondary content (e.g., advertisements) are updated, a subtle transition may be possible.

If at block 720, method 700 determines that the content can be updated subtly, at block 730, method 700 performs a subtle content transition. If at block 720, method 700 determines that the content cannot be updated subtly, at block 740, method 700 performs a manual update process for the entire web page. Additional details of the manual update process may be provided below with respect to FIG. 8.

Figure 8:
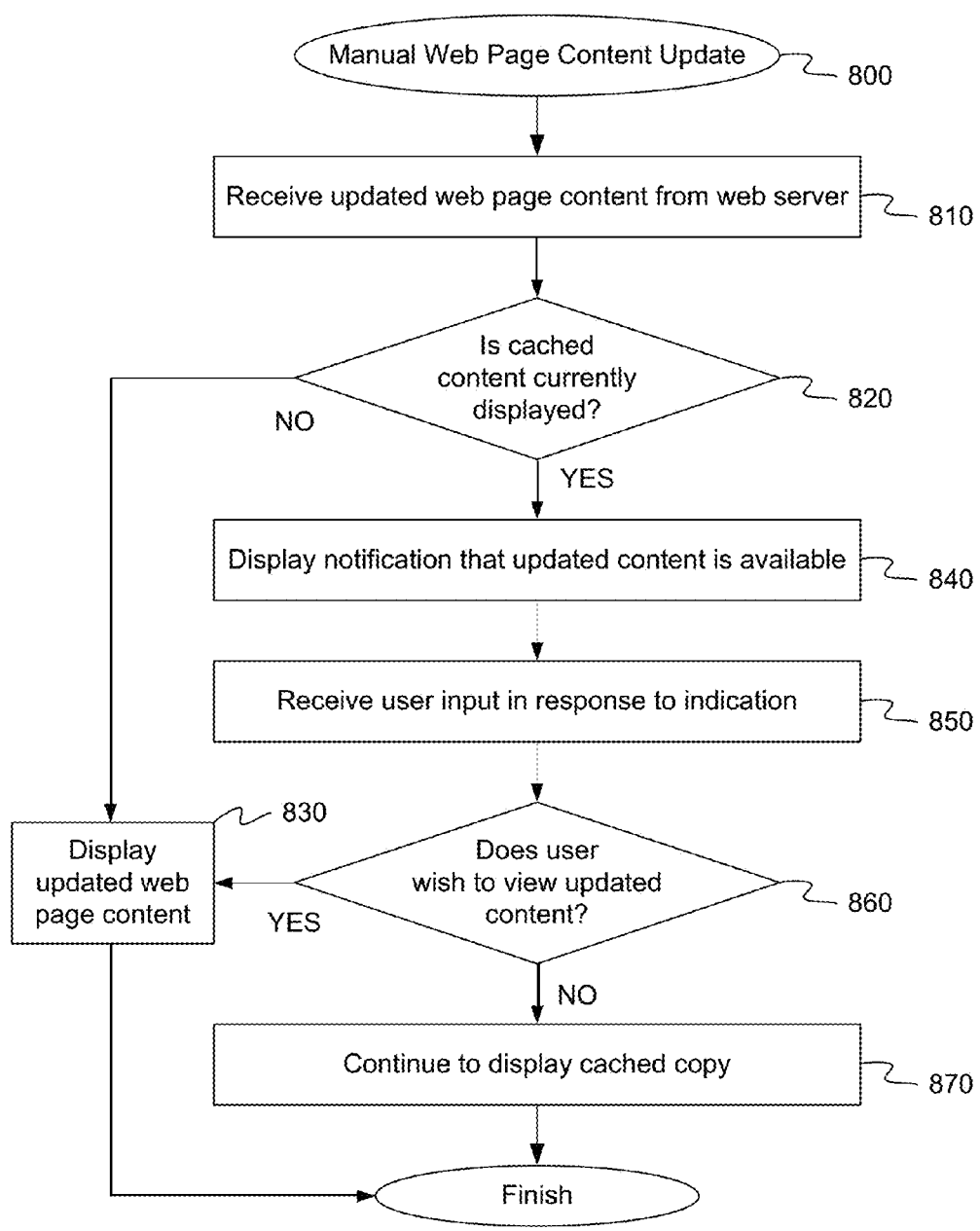
FIG. 8 is a flow diagram illustrating a manual web page content update method, according to embodiment.

FIG. 8 is a flow diagram illustrating a manual web page content update method, according to embodiment of the present invention. The method 800 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to determine whether a user wishes to manually update the entire web page content. In one embodiment, method 800 may be performed by content logic 316 and transition logic 317, as shown in FIGS. 3 and 4.

Referring to FIG. 8, at block 810, method 800 receives updated web page content from web server 320. In one embodiment, in response to the request for updated content, if one or more of the content objects from the cached copy of the web page are stale, content update module 415 may receive a copy of the updated content object(s) from web server 320.

At block 820, method 800 determines whether a cached copy of the web page is currently displayed. Content logic 316 may access browser engine 314 to determine the status of any web page currently being displayed in web browser 312. If at block 820, method 800 determines that a cached copy of the web page is not currently displayed, at block 830, method 800 displays the updated web page content.

If at block 820, method 800 determines that a cached copy of the web page is currently displayed, at block 840, method 800 displays a notification that updated content is available. This manual web page content update may be initiated when the update is larger or more significant, possibly affecting a major object or multiple objects on the page. In one embodiment, user selection module 430 may display a dialog box, pop-up window, notification bar 150, or other indication that there is updated content available for the current web page being viewed. The indication may allow the user to select whether to transition to the updated content or to continue viewing and interacting with the currently displayed cached copy.

At block 850, method 800 receives user input entered in response to the notification. At block 860, method 800 determines whether the user wishes to view the updated content. In one embodiment, user selection module 430 may analyze the user input received at block 850 determine the user's intent. If at block 860, method 800 determines that the user does not wish to view the updated content, at block 870, method 800 continues to display the cached copy of the web page. In one embodiment, user selection module 430 may send a message to content logic 316 indicating that the user does not wish to transition to the updated content.

If at block 860, method 800 determines that the user does wish to view the updated content, at block 830, method 800 displays the updated web page content. In one embodiment, user selection module 430 may send a message to content logic 316 causing it to load the updated content in the new version of the web page. In one embodiment, user information module 435 in transition logic 317 may maintain user information that the user entered when viewing the cached copy of the web page. For example, as shown in FIG. 1, if the cached copy of web page 122 includes user input field 129, a user may have input certain information into that field (e.g., a search query). User information module 435 may maintain a copy of that information and store it, for example, as user information data 455 in internal data store 318. When method 800 transitions to the updated content at block 830, user information module 435 may copy the stored user information data 455 into a corresponding field in the updated web page once it is displayed. In this manner, the user will not lose information that he entered into the cached copy if he chooses to transition to the updated version.

Figure 9:
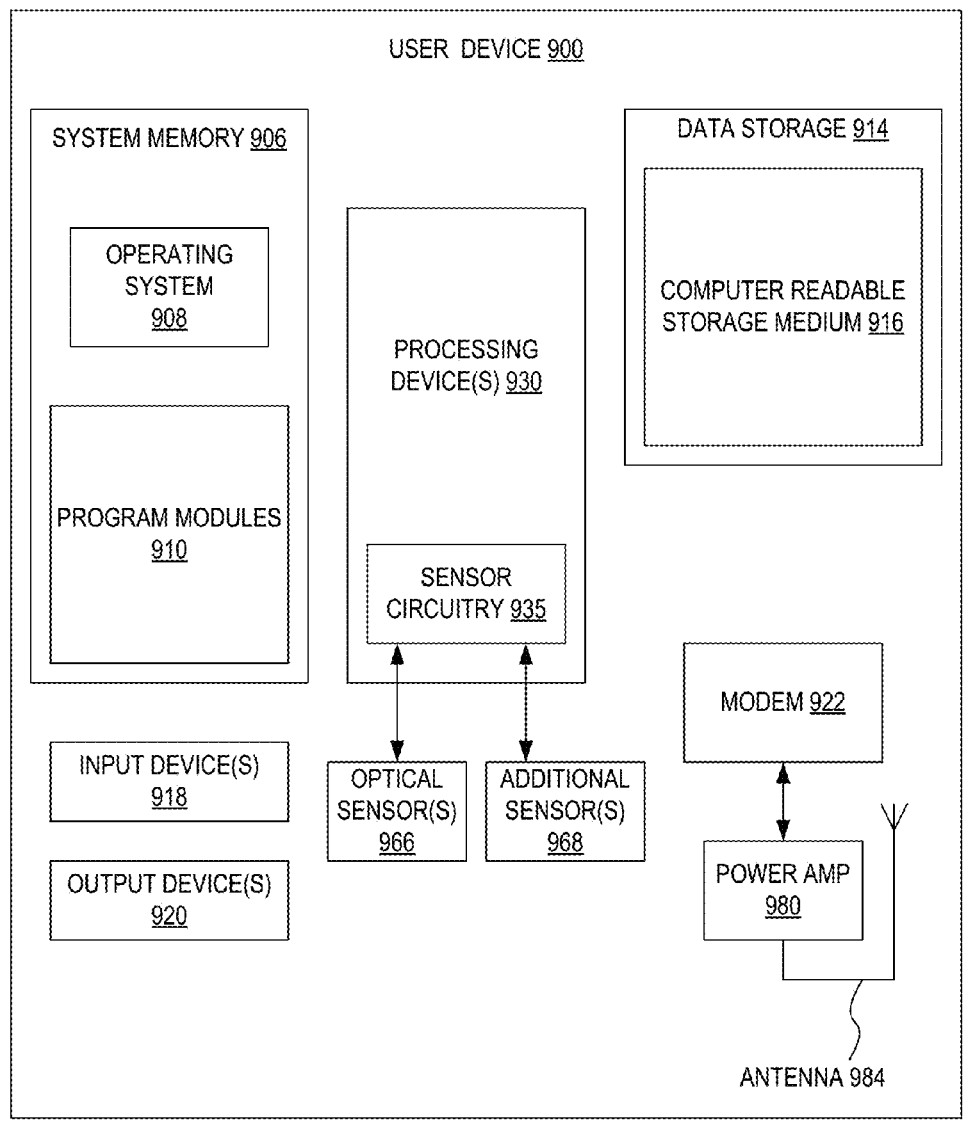
FIG. 9 is a block diagram illustrating an exemplary user device, according to an embodiment.

FIG. 9 is a block diagram illustrating an exemplary user device 900, according to an embodiment of the present invention. In one embodiment, the user device 900 may correspond to the user device 310 of FIG. 3 may be any type of user device such as an electronic book reader, a PDA, a mobile phone, a laptop computer, a portable media player, a tablet computer, an electronic pad, a desktop computer, a camera, a video camera, a netbook, or the like.

The user device 900 includes one or more processing devices 930, such as one or more CPUs, microcontrollers, field programmable gate arrays, or other types of processing devices. The user device 900 also includes system memory 906, which may correspond to any combination of volatile and/or non-volatile storage mechanisms. The system memory 906 stores information which provides an operating system component 908, various program modules 910, and/or other components. The user device 900 performs functions by using the processing device(s) 930 to execute instructions provided by the system memory 906.

The user device 900 also includes a data storage device 914 that may be composed of one or more types of removable storage and/or one or more types of non-removable storage. The data storage device 914 includes a computer-readable storage medium 916 on which is stored one or more sets of instructions embodying any one or more of the methodologies or functions described herein. As shown, the instructions may reside, completely or at least partially, within the computer readable storage medium 916, system memory 906 and/or within the processing device(s) 930 during execution thereof by the user device 900, the system memory 906 and the processing device (s) 930 also constituting computer-readable media. The user device 900 may also include one or more input devices 918 (keyboard, mouse device, specialized selection keys, etc.) and one or more output devices 920 (displays, printers, audio output mechanisms, etc.).

The user device 900 further includes a wireless modem 922 to allow the user device 900 to communicate via a wireless network (e.g., such as provided by the wireless communication system) and/or with other computing devices, such as remote computers, the item providing system, online book stores, electronic catalogs for libraries, and so forth. The wireless modem 922 may allow the user device 900 to handle both voice and non-voice communications (such as communications for text messages, multimedia messages, media downloads, web browsing, etc.) with a wireless communication system, such as network 330. The wireless modem 922 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi, etc. The wireless modem 922 may generate signals and send these signals to power amplifier (amp) 980 for amplification, after which they are wirelessly transmitted via antenna 984. In addition to sending data, antenna 984 also receives data, which is sent to wireless modem 922 and transferred to processing device(s) 930.

In one embodiment, user device 900 includes an optical sensor 966. In one embodiment, user device 900 includes one or more additional sensors 968 such as a physical contact sensor, close proximity sensors, or motion sensors. In one embodiment, the additional sensors 968 include a motion sensor, such as an accelerometer or one or more gyroscopes.

The processing device(s) 930 may include sensor circuitry 935 (e.g., sensor device drivers) that enables the processing device(s) 930 to interpret signals received from the optical sensor(s) 966 and/or additional sensors 968. In one embodiment, the optical sensors 966 and/or additional sensors 968 output raw sensor data. In another embodiment, the optical sensors 966 and/or additional sensors 968 output fully processed signals to the processing device(s) 930. For example, the additional sensors 968 may output a user contact/no user contact signal using a single line interface or a multi-line interface. In another embodiment, the additional sensors 968 output, for example, positional data and/or object presence data (e.g., of a human body part) to the processing devices 930 without first processing the data. In either instance, the processing devices 930 may use the sensor circuitry 935 to process and/or interpret the received data. If data is received from multiple sensors, processing the data may include averaging the data, identifying a maximum from the data, or otherwise combining the data from the multiple sensors.

Figure 10:
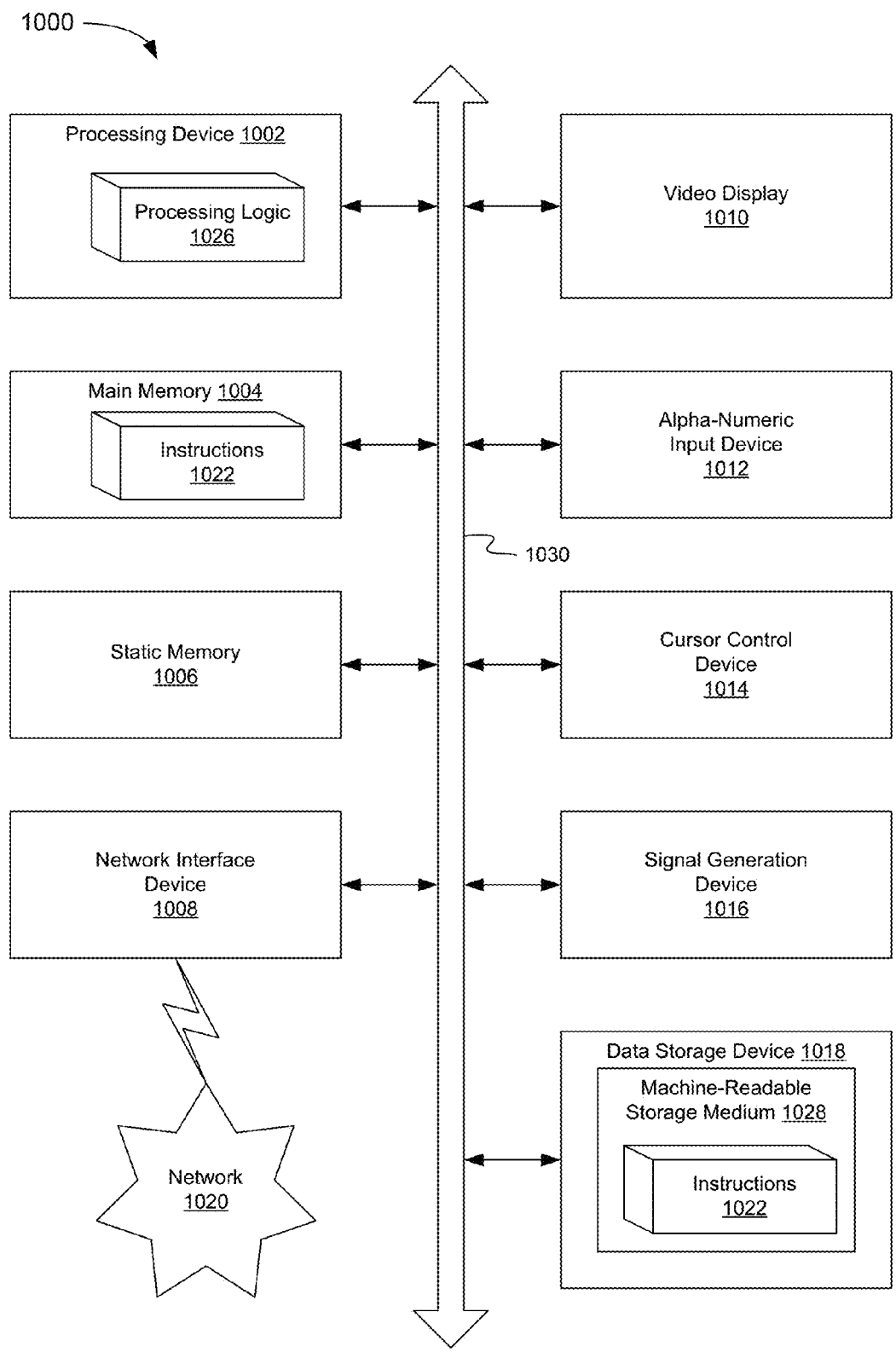
FIG. 10 is a block diagram illustrating an exemplary computer system, according to an embodiment.

FIG. 10 illustrates a diagrammatic representation of a machine in the exemplary form of a computer system 1000 within which a set of instructions, for causing the machine to perform any one or more of the methodologies discussed herein, may be executed. The system 1000 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1000 may represent web server 320 and/or user device 310 of FIG. 3.

The exemplary computer system 1000 includes a processing device (processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute the content logic 316 and the transition logic 317 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a computer-readable medium 1028 on which is stored one or more sets of instructions 1022 (e.g., instructions of notification manager 210) embodying any one or more of the methodologies or functions described herein. The instructions 1022 may also reside, completely or at least partially, within the main memory 1004 and/or within processing logic 1026 of the processing device 1002 during execution thereof by the computer system 1000, the main memory 1004 and the processing device 1002 also constituting computer-readable media. The instructions may further be transmitted or received over a network 1020 via the network interface device 1008.

While the computer-readable storage medium 1028 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device, a request to load a web page into a web browser;
   determining, by the processing device, that a cached copy of the web page is available in a browser cache;
   begin loading, by the processing device, the cached copy of the web page into the web browser prior to requesting updated content from a web server hosting the web page when an age of the cached copy is less than an age threshold value;
   while the cached copy of the web page is loading, sending, by the processing device, a request to the web server for the updated content;
   receiving the updated content from the web server;
   causing display, in the web browser, that the updated content is received;
   receiving user input representing an indication to display an updated version of the web page comprising the updated content; and
   in response to receiving the user input, causing display of the updated version of the web page, without completely reloading the web page, by removing at least one stale content object from the cached copy of the web page and loading at least one updated content object into the web browser for display.

2. The method of claim 1, wherein the browser cache to store cached copies of web pages previously loaded in the web browser, and wherein the stale content comprises content in the web page that was updated by the web server after the cached copy was saved in the browser cache.

3. The method of claim 1, further comprising:
determining that the web page is found on an exclusion list comprising a list of web pages for which loading the cached copy from the browser cache is not appropriate;
requesting content for the web page from the web server without loading the cached copy of the web page.

4. A system, comprising:
a memory; and
a processing device, operatively coupled to the memory, the processing device to:
in response to a request to load a web page in a web browser, begin loading a cached copy of the web page prior to retrieving updated content from a web server when an age of the cached copy is less than an age threshold value;
while the cached copy of the web page is loading, retrieve the updated content from the web server; and
once the updated content is retrieved, cause display, in the web browser, that the updated content is retrieved;
receive user input representing an indication to display an updated version of the web page comprising the updated content; and
in response to receiving the user input, cause display of the updated version of the web page, without completely reloading the web page, by removing at least one stale content object from the cached copy of the web page and loading at least one updated content object into the web browser for display.

5. The system of claim 4, the processing device further to:
determine that a cached copy of the web page is available in a browser cache by comparing a uniform resource identifier (URI) of the web page to a list of URIs in the browser cache.

6. The system of claim 4, wherein to retrieve updated content to be displayed in the web page, the processing device to send a request to the web server hosting the web page for the updated content to be displayed in the web page, the request comprising an identifier of the web page and a timestamp value indicating a time when the cached copy of the web page was cached.

7. The system of claim 4, wherein the processing device to determine whether to load the updated content in the web page, without completely reloading the web page, in view of at least one of how many content objects on the web page are updated, what percentage of content objects on the web page are updated, or what type of content objects on the web page are updated.

8. The system of claim 4, wherein in response to the processing device determining not to load the updated content in the web page, without completely reloading the web page, the processing device to completely reload the web page by removing the cached copy and displaying the updated version of the web page.

9. The system of claim 4, the processing device further to:
determine that the web page is found on an exclusion list comprising a list of web pages for which loading the cached copy from a browser cache is not appropriate.

10. The system of claim 9, wherein the list of web pages on the exclusion list are determined in view of at least one of an average load time of the web page, how often cached content to be displayed in the web page is stale, which content objects in the web page are updated most frequently, or whether a user has added the web page to the exclusion list.

11. A non-transitory computer-readable storage medium storing instructions which, when executed, cause a processing device to perform operations comprising:
begin loading, by the processing device, a cached copy of a web page into a web browser prior to receiving updated content from a web server when an age of the cached copy is less than an age threshold value;
receiving, by the processing device from the web server, the updated content;
causing display in the web browser, by the processing device, that the updated content is available;
receiving, by the processing device, user input representing an indication to display an updated version of the web page comprising the updated content; and
in response to receiving the user input, causing display, by the processing device, the updated version of the web page, without completely reloading the web page, by removing at least one stale content object from the cached copy of the web page from the web browser and loading at least one updated content object into the web browser for display.

12. The non-transitory computer-readable storage medium of claim 11, the operations further comprising:
causing display of the cached copy of the web page in response to receiving a request to load the web page, wherein the cached copy was stored in a browser cache when the web page was previously loaded in the web browser.

13. The non-transitory computer-readable storage medium of claim 11, the operations further comprising:
receiving the updated content to be displayed in the web page in response to a request issued to the web server while the cached copy of the web page was loading.

14. The non-transitory computer-readable storage medium of claim 11, further comprising causing display of notification bar in the web browser, the notification bar comprising one or more user input buttons to receive user input indicating whether to transition from the cached copy of the web page to the updated version.

15. The non-transitory computer-readable storage medium of claim 14, the operations further comprising:
in response to the user input indicating not to transition to the updated version of the web page, continuing to display the cached copy of the web page.

16. The non-transitory computer-readable storage medium of claim 11, the operations further comprising:
copying user information input into an input field in the cached copy of the web page;
storing the user information in an internal data store; and
pasting the user information from the internal data store back into the input field in the updated version of the web page.

* * * * *